(12) United States Patent
Neven

(10) Patent No.: US 11,900,214 B2
(45) Date of Patent: *Feb. 13, 2024

(54) ENHANCING SIMULATED ANNEALING WITH QUANTUM ANNEALING

(71) Applicant: Google LLC, Mountain View, CA (US)

(72) Inventor: Hartmut Neven, Malibu, CA (US)

(73) Assignee: Google LLC ( * ) Notice: Subject to any disclaimer, the term of this patent is extended or adjusted under 35 U.S.C. 154(b) by 113 days.

This patent is subject to a terminal disclaimer.

(21) Appl. No.: 17/394,140

(22) Filed: Aug. 4, 2021

(65) Prior Publication Data

US 2021/0374596 A1  Dec. 2, 2021

Related U.S. Application Data

(63) Continuation of application No. 16/067,338, filed as application No. PCT/US2016/068400 on Dec. 22, 2016, now Pat. No. 11,113,620.

(Continued)

(51) Int. Cl.
*G06N 10/00* (2022.01)
*G06N 7/01* (2023.01)
*G06F 15/163* (2006.01)

(52) U.S. Cl.
CPC .......... *G06N 10/00* (2019.01); *G06F 15/163* (2013.01); *G06N 7/01* (2023.01)

(58) Field of Classification Search
CPC ........ G06N 10/00; G06N 7/005; G06N 5/003; G06F 15/163–17393
See application file for complete search history.

(56) References Cited

U.S. PATENT DOCUMENTS 9,152,746 B2   10/2015   Troyer et al.
2002/0117738 A1*  8/2002   Amin ................ B82Y 10/00
                                                257/E39.015

(Continued)

FOREIGN PATENT DOCUMENTS

CN   101739508   6/2010
CN   105960650   9/2016

(Continued)

OTHER PUBLICATIONS

EP Office Action in European Application No. 16826832, dated Apr. 6, 2020, 9 pages.

(Continued)

*Primary Examiner* — Amar Movva
(74) *Attorney, Agent, or Firm* — Fish & Richardson P.C.

(57) ABSTRACT

Methods and apparatus for enhancing simulated annealing with quantum fluctuations. In one aspect, a method includes obtaining an input state; performing simulated annealing on the input state with a temperature reduction schedule until a decrease in energy is below a first minimum value; terminating the simulated annealing in response to determining that the decrease in energy is below the first minimum level; outputting a first evolved state and first temperature value; reducing the temperature to a minimum temperature value; performing quantum annealing on the first evolved state with a transversal field increase schedule until a completion of a second event occurs; terminating the quantum annealing in response to determining that a completion of the second event has occurred; outputting a second evolved state as a subsequent input state for the simulated annealing, and determining that the completion of the first event has occurred.

19 Claims, 4 Drawing Sheets

Related U.S. Application Data

(60) Provisional application No. 62/273,134, filed on Dec. 30, 2015.

(56) References Cited

U.S. PATENT DOCUMENTS

| | | | |
|---|---|---|---|
| 2005/0118637 A9 | 6/2005 | Levinson et al. | |
| 2009/0121215 A1 | 5/2009 | Choi | |
| 2016/0260013 A1* | 9/2016 | Rønnow | G06F 17/11 |
| 2017/0300817 A1 | 10/2017 | King et al. | |

FOREIGN PATENT DOCUMENTS

| | | |
|---|---|---|
| CN | 105989409 | 10/2016 |
| WO | WO 2015/143439 | 9/2015 |

OTHER PUBLICATIONS

EP Office Action in European Application No. 16826832, dated Nov. 27, 2019, 11 pages.

PCT International Preliminary Report on Patentability issued in International Application No. PCT/US2016/68400, dated Apr. 24, 2018, 21 pages.

PCT International Search Report and Written Opinion issued in International Application No. PCT/US2016/068400, dated Apr. 18, 2017, 16 pages.

Quantum annealing and related optimization methods, [Book] Lecture Notes Phys. 679, Springer, Jan. 2005, specifically Part 1 sections titled "Transverse Ising Movel, Glass and Quantum Annealing," and "Ergodicity, Replica Symmetry, Spin Glass and Quantum Phase Transition," 80 pages.

Office Action in Chinese Appln. No. 201680081437.X, dated Jun. 24, 2021, 12 pages (with English translation).

* cited by examiner

ENHANCING SIMULATED ANNEALING WITH QUANTUM ANNEALING

CROSS-REFERENCE TO RELATED APPLICATIONS

This application is a continuation application of, and claims priority to, U.S. patent application Ser. No. 16/067,338, titled "ENHANCING SIMULATED ANNEALING WITH QUANTUM ANNEALING," filed on Jun. 29, 2018, which application is a National Stage Application under 35 U.S.C. § 371 and claims the benefit of International Application No. PCT/US2016/068400, filed Dec. 22, 20216, which application claims the benefit under 35 U.S.C. § 119(e) of priority to Provisional Application No. 62/273,134, filed on Dec. 30, 2015. The disclosure of the foregoing applications are incorporated herein by reference in their entirety for all purposes.

BACKGROUND

This specification relates to quantum computing.

Optimization tasks can be translated into machine learning optimization problems. In an annealing method of optimization, an optimal solution to a computational task encoded in a lowest energy configuration of a physical system. The lowest energy configuration may be achieved by thermal annealing, for example cooling down the system approaching zero temperature, or quantum annealing, for example tunneling through energy barriers.

SUMMARY

This specification relates to constructing and programming quantum hardware for quantum annealing processes. In particular, this specification describes technologies for enhancing simulated annealing with quantum fluctuations.

In general, one innovative aspect of the subject matter described in this specification can be implemented in a method that includes the actions obtaining an initial input state; performing simulated annealing and quantum annealing on the initial input state and subsequent input states until a completion of a first event; and determining that the completion of the first event has occurred.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations performing simulated annealing and quantum annealing on the initial input state and subsequent input states comprises: receiving an input state, the input state being one of the initial input state or a subsequent input state; performing simulated annealing on the input state with a temperature reduction schedule until a decrease in energy is below a first minimum value; terminating the simulated annealing in response to determining that the decrease in energy is below the first minimum level; outputting a first evolved state and first temperature value; reducing the temperature to a minimum temperature value; performing quantum annealing on the first evolved state with a transversal field increase schedule until a completion of a second event occurs; terminating the quantum annealing in response to determining that a completion of the second event has occurred; and outputting a second evolved state as a subsequent input state for the simulated annealing.

In other implementations determining that the completion of the first event has occurred comprises determining that the first temperature value is lower or equal to the minimum temperature value.

In some cases the initial input state is a state of a physical system whose ground state encodes the solution to an optimization task.

In other cases determining that the completion of the first event has occurred further comprises performing a measurement on the first evolved state output with the first temperature value to determine the solution to the optimization task.

In some implementations performing simulated annealing on the input state with a temperature reduction schedule comprises performing a Metropolis algorithm.

In other implementations performing quantum annealing comprises repeating a number of sweeps of quantum annealing until the completion of the second event occurs.

In further implementations performing quantum annealing comprises repeating a number of sweeps of quantum annealing until a decrease in energy is below a second minimum value, wherein the second minimum value is different from the first minimum value.

In some cases performing quantum annealing comprises: creating a list of connected subgraphs; computing a lowest achievable energy value for each connected subgraph; computing the difference between a current energy value and the lowest achievable energy value for each connected subgraph; determining that at least one difference is positive; selecting the subgraph and corresponding transition that achieves an overall largest positive difference; and performing the corresponding transition that achieves the overall largest positive difference.

In some cases the connected subgraphs are of size K.

In some implementations the number of repeated sweeps is at most $Q_S N/K$, wherein $Q_S$ is a predetermined number of quantum sweeps and N is a system size.

In some cases completion of a second event occurs when either (i) a fixed number of quantum sweeps have been performed, or (ii) the lowest achievable energy value for each connected subgraph is the same or higher than the current energy value.

In further cases selecting the subgraph and corresponding transition that achieves the overall largest positive difference further comprises: calculating a Hamming distance for each connected subgraph in a set of connected subgraphs that achieves the overall lowest achievable energy value; determining that there is one subgraph with a shortest Hamming distance relative to the Hamming distance of other subgraphs; and choosing the transition that has the shortest Hamming distance in response to determining that there is one subgraph with the shortest Hamming distance.

In some implementations the method further comprises determining that there is more than one subgraph with a shortest Hamming distance; and choosing the transition from the set of subgraphs that achieve the overall lowest achievable energy value and that have the shortest Hamming distance at random.

In some cases the initial input state is a randomly chosen state.

In other cases the initial input state is a classical state.

In some implementations preparing the classical state comprises setting the temperature to a predetermined maximum value.

The subject matter described in this specification can be implemented in particular ways so as to realize one or more of the following advantages. An annealing system implementing a land rover algorithm for quantum-classical annealing enhances thermal annealing with quantum fluctuations. For example, if the energy landscape is simple, e.g., smooth without local minima, thermal annealing may be applied. If the complexity of the energy landscape increases, e.g., due to thin but high energy barriers surrounding shallow local minima, quantum annealing may be applied. Such enhancing of thermal annealing with quantum fluctuations may result in reduced computational costs and a computational speedup compared to annealing systems that perform only thermal annealing, such as simulated annealing or spin vector Monte Carlo. In some cases the computational speedup may be a quadratic speedup.

Thermal and quantum transitions traverse energy barriers differently. Therefore, purely quantum annealing systems may be able to efficiently solve some specific, well-chosen problems better than a classical annealing system. Similarly, classical annealing systems may provide a superior method of solving some specific problems if there are no obvious regularities that may be exploited. By combining classical annealing and quantum annealing, an annealing system implementing a land rover algorithm for quantum-classical annealing may be applicable to a wider range of problems and annealing tasks and may provide optimal methods for solving the problems and annealing tasks.

An annealing system implementing a land rover algorithm for quantum-classical annealing may be used to find better solutions to hard optimization problems than annealing systems that implement only classical annealing or only quantum annealing.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
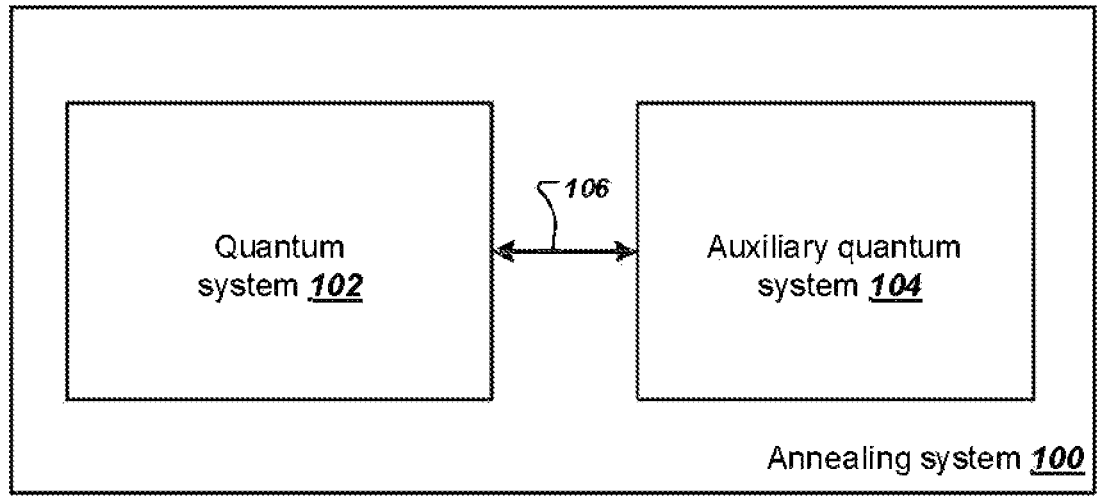
FIGS. 1A and 1B depict example systems for performing annealing using a Land Rover algorithm.

Classical cooling algorithms such as simulated annealing may provide techniques for approximating a global minimum of a given function. A simulated annealing algorithm may initially start with temperature T set to a high value to overcome tall energy barriers. As the algorithm progresses, the temperature may be gradually lowered to distinguish between local minima with small energy differences, causing the process to eventually freeze once the thermal energy is lower than the height of the barriers surrounding the current state. Quantum annealing may utilize quantum tunneling to find the global minimum of a given function. A quantum annealing algorithm may initially start with a superposition of all possible states with equal weights and evolves according to the time-dependent Schrödinger equation, where during evolution the amplitudes of all possible states may change according to a time-dependent strength of a transverse field, causing quantum tunneling between states.

This specification describes an architecture and method for enhancing simulated annealing with quantum annealing. An annealing system may be prepared an initial input state, e.g., a random classical state, of a physical system and execute simulated annealing with a temperature reduction schedule on the initial input state until the energy decrease slows below a desired level. At that point, the temperature may be dialed down to a minimum value and the transversal field may be turned up to increase quantum fluctuations. After a phase of increased quantum fluctuations the transversal field may be turned down and simulated annealing with a temperature reduction schedule may be resumed. The process may be performed iteratively until a desired energy state of the physical system is reached, e.g., until the ground state of the physical system is reached. In some implementations a solution to an optimization problem, e.g., a binary combinatorial optimization problem, may be encoded in the desired energy state of the physical system.

Example Operating Environment

FIG. TA depicts an example annealing system 100 for performing annealing using a Land Rover algorithm. The example system 100 is an example of a system implemented as classical or quantum computer programs on one or more classical computers or quantum computing devices in one or more locations, in which the systems, components, and techniques described below can be implemented.

The annealing system 100 may be configured to perform simulated annealing followed by quantum annealing on an initial input state and subsequent input states. The annealing system 100 may include a quantum system 102 that interacts with an auxiliary quantum system 104. The auxiliary quantum system 104 may act as a controllable thermal bath for the quantum system 102. The quantum system 102 may include one or more interacting quantum subsystems, e.g., one or more interacting qubits. The one or more quantum subsystems included in the quantum system 102 may include superconducting qubits. In some implementations the quantum system 102 may be an open quantum system.

The auxiliary quantum system 104 may include a set of lossy resonators, transmission lines, array of qubits, or meta-materials. In some implementations the auxiliary quantum system 104 may be an open quantum system that interacts with an environment that is external to the quantum system 102 and the auxiliary quantum system 104. In other implementations the auxiliary quantum system 104 may be a closed quantum system that does not interact with an external environment.

The quantum system 122 may interact with the auxiliary quantum system 104 through one or more couplings, e.g., coupling 106. The coupling of the auxiliary quantum system 104 to the quantum system 102 may enable the auxiliary quantum system to interact with the quantum system such that fluctuations of the auxiliary system 104 may affect the dynamics of the quantum system 102. As an example, the auxiliary quantum system 104 may include one or more multi-mode resonators, and the quantum system 102 may include one or more qubits that are either respectively coupled to a respective multi-mode resonator, or collectively coupled to a single multi-mode resonator. In some implementations the auxiliary quantum system 104 may include a continuous mode of resonators (also known as microwave metamaterial).

The one or more couplings 106 may be controllable couplings. The controllability of the couplings depends on the particular physical realization of the qubits that are coupled, e.g., two-level atoms, electron spins, or superconducting qubits. For example, in the case of electron spins, the couplings between spin qubits may be controlled via applying external electromagnetic fields, where the external electromagnetic fields in turn are controllable by adjusting the parameters of the machines used to apply the electromagnetic field, such as the wavelength and amplitude of the electromagnetic field. In the case of superconducting qubits, the interaction between the qubits may be controlled through adjusting the current bias, for example by adjusting current bias pulses with controlled amplitude and duration.

Figure 1B:
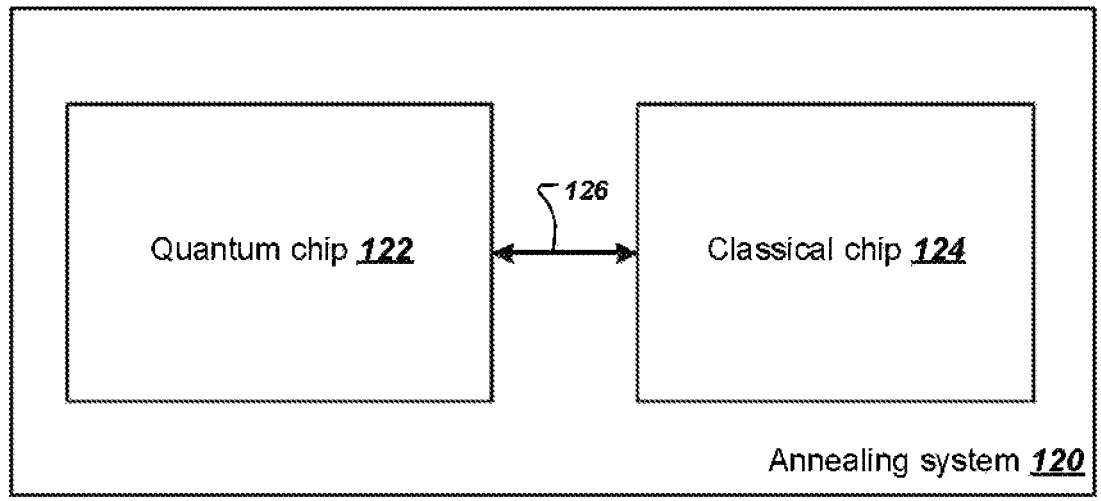

FIG. 1B depicts an example annealing system 120 for performing annealing using a Land Rover algorithm. The example system 120 is an example of a system implemented as classical or quantum computer programs on one or more classical computers or quantum computing devices in one or more locations, in which the systems, components, and techniques described below can be implemented.

The annealing system 120 may be configured to perform simulated annealing followed by quantum annealing on an initial input state and subsequent input states. The annealing system 120 may include a quantum integrated circuit (chip) 122 in communication with a classical integrated circuit (chip) 124. The quantum integrated circuit 122 may be configured to perform quantum annealing on an initial state, for example an arbitrary classical state, and communicate with the classical integrated circuit 124 that may be configured to perform simulated annealing through one or more couplings 126.

Programming the Hardware

Figure 2:
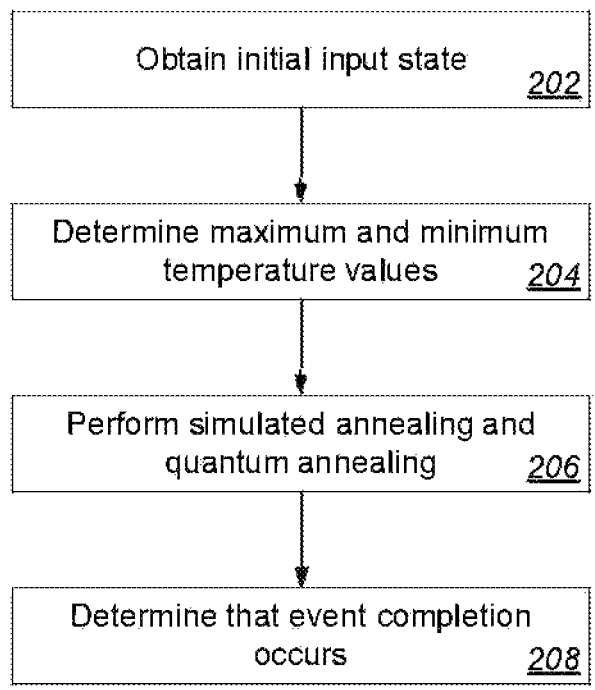
FIG. 2 is a flow diagram of an example process for performing annealing using a Land Rover algorithm.

FIG. 2 is a flowchart of an example process 200 for performing annealing using a Land Rover algorithm. For convenience, the process 200 will be described as being performed by a system of one or more classical or quantum computing devices located in one or more locations. For example, an annealing system, e.g., the annealing systems 100 and 120 of FIGS. 1A and 1B, respectively, appropriately programmed in accordance with this specification, can perform the process 200.

The system obtains an initial input state (step 202). Data specifying the initial input state may be received by the annealing system or prepared by the annealing system. The initial input state may be a randomly chosen state. In some implementations the initial input state may be a classical state. The solution to an optimization task may be encoded into a ground state of a physical system included in the annealing system, e.g., quantum system 122 in annealing system 120 of FIG. 1B, that is described by the initial input state.

The system may determine a maximum temperature value $T_{max}$ and a minimum temperature value $T_{min}$ (step 204). As described above with reference to step 202, in some implementations the system may prepare an initial input state that is a classical input state. Preparing the classical input state may include setting the temperature to the predetermined maximum value $T_{max}$, e.g., setting the external temperature of the classical state to the predetermined maximum value $T_{max}$.

The values of $T_{max}$ and $T_{min}$ determined by the system may depend on the physical system described by the initial input state and the purpose of performing annealing. For example, if the solution to an optimization task is encoded into the ground state of the physical system, the value of $T_{min}$ may be determined based on a known temperature at which the ground state of the physical system may be achieved.

The system performs simulated annealing followed by quantum annealing on the initial input state and subsequent input states until a completion of a first event occurs (step 206). For example, the completion of the first event may be when the temperature of a current iteration of simulated annealing followed by quantum annealing on an input state is smaller than or equal to the minimum temperature value $T_{min}$. An iteration and illustration of simulated annealing followed by quantum annealing on an input state is described in more detail below with reference to FIGS. 3 and 4 respectively.

The system determines that the completion of the first event occurs (step 208). For example, the system may determine that the temperature of a current iteration of simulated annealing followed by quantum annealing on an input state is smaller than or equal to the minimum temperature value $T_{min}$. Upon determination, simulated and quantum annealing may be terminated and a final evolved state may be output. The final evolved state may be provided for post processing. For example, if a solution to an optimization task is encoded into the ground state of the physical system, the final evolved state may correspond to the ground state and the solution to the optimization task may be determined via suitable measurements of the final evolved state.

Figure 3:
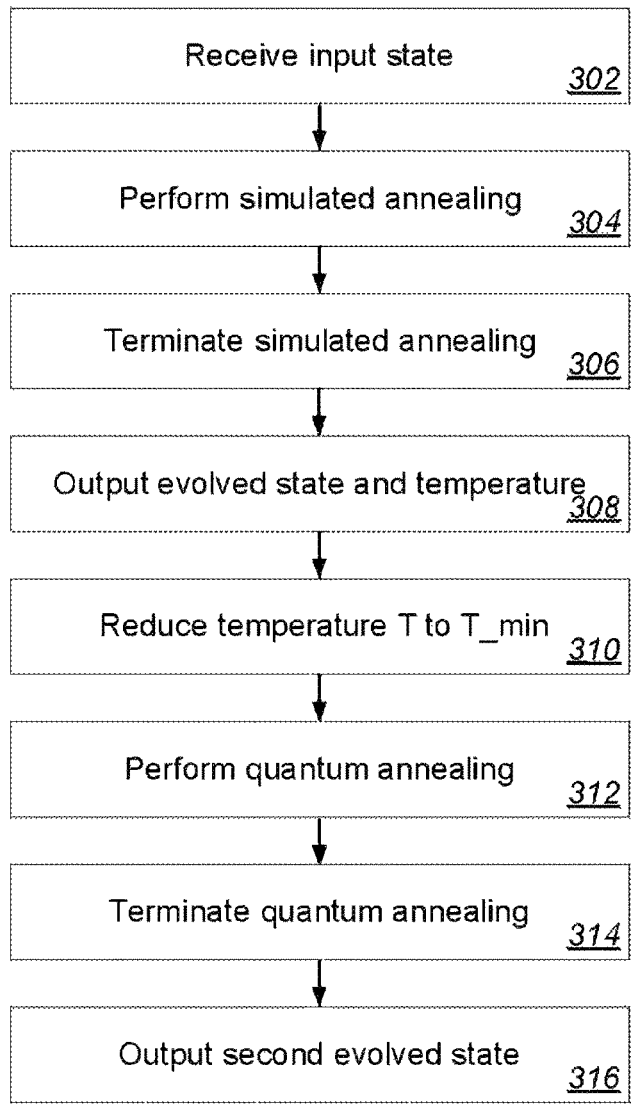
FIG. 3 is a flow diagram of an example iteration of performing simulated annealing followed by quantum annealing in a Land Rover algorithm.

FIG. 3 is a flowchart of an example iteration 300 of performing simulated annealing followed by quantum annealing in a land rover algorithm. For convenience, the process 200 will be described as being performed by a system of one or more classical or quantum computing devices located in one or more locations. For example, an annealing system, e.g., the annealing systems 100 and 120 of FIGS. 1A and 1B, respectively, appropriately programmed in accordance with this specification, can perform the process 200.

The system receives an input state (step 302). The input state may be one of the initial input state describing a physical system included in the annealing system, as described above with reference to step 202 of FIG. 2, or a subsequent input state resulting from a completed iteration of simulated annealing followed by quantum annealing in a land rover algorithm.

The system performs simulated annealing on the input state with a temperature reduction schedule until a decrease in energy is below a first minimum value (step 304). In some implementations the system may perform simulated annealing on the input state with a temperature reduction schedule according to a Metropolis algorithm.

The system terminates the simulated annealing (step 306). The system may terminate the simulated annealing in response to determining that a decrease in energy is below a first minimum level, e.g., a decrease in energy of states corresponding to consecutive time steps specified by the temperature reduction schedule. For example, the system may terminate simulated annealing in response to determining that no move to another state was accepted during a previous number of Metropolis steps.

The system outputs a first evolved state and first temperature value (step 308). The first evolved state and first temperature value may correspond to the current evolved state and the current temperature. When performing multiple iterations of simulated annealing followed by quantum annealing, the first temperature value may be stored and provided as an initial temperature for a next iteration of simulated annealing.

The system reduces the temperature to the minimum temperature value (step 310). By reducing the temperature to the minimum temperature value the system may effectively turn off the simulated annealing.

The system performs quantum annealing on the first evolved state (step 312). The system may perform quantum annealing on the first evolved state with a transversal field increase schedule until a completion of a second event occurs. In some implementations performing quantum annealing may include repeating a number of sweeps of quantum annealing until the completion of the second event occurs. In other implementations performing quantum annealing may include repeating a number of sweeps of quantum annealing until a decrease in energy is below a second minimum value, wherein the second minimum value is different from the first minimum value.

In some implementations the physical system may be described by a connectivity graph that represents the constituents of the physical system and their interactions, e.g., qubits and their interactions. The system may perform quantum annealing by creating a list of connected subgraphs of size K≤N, where N is the size of the physical system. In some implementations the number of repeated quantum sweeps of quantum annealing described above with reference to step 312 may be at most $Q_S N/K$, wherein $Q_S$ is a predetermined number of quantum sweeps.

The system may compute a lowest achievable energy value for each connected subgraph and compute the difference between a current energy value and the lowest achievable energy value for each connected subgraph.

The system may determine that at least one of the computed differences is positive and select the subgraph and corresponding state transition that achieves an overall largest positive difference. The system may further perform the corresponding state transition that achieves the overall largest positive difference, i.e., the system may change the state to a state corresponding to the state transition that achieves the overall largest positive difference.

In some implementations the system may select the subgraph and corresponding transition that achieves the overall largest positive difference by calculating a Hamming distance for each connected subgraph in a set of connected subgraphs that achieves the overall lowest achievable energy value. In some cases the system may further determine that there is one subgraph with a shortest Hamming distance relative to the Hamming distance of other subgraphs and choose the transition that has the shortest Hamming distance in response to determining that there is one subgraph with the shortest Hamming distance. In other cases the system may determine that there is more than one subgraph with a shortest Hamming distance and choose a transition from the set of subgraphs that achieve the overall lowest achievable energy value and that have the shortest Hamming distance at random.

The system terminates quantum annealing (step 314). The system may terminate quantum annealing in response to determining that the completion of the second event has occurred. For example, the completion of the second event may be that a fixed number of quantum sweeps have been performed. In another example, the completion of the second event may be that the system has determined that the lowest achievable energy value for each connected subgraph is the same or higher than the current energy value.

The system outputs a second evolved state (step 316). The system may provide the second evolved state as a subsequent input state for the simulated annealing as described above with reference to step 302 if the temperature stored in step 308 above is higher than a predetermined minimum temperature, e.g., $T_{min}$ described above with reference to FIG. 2.

Figure 4:
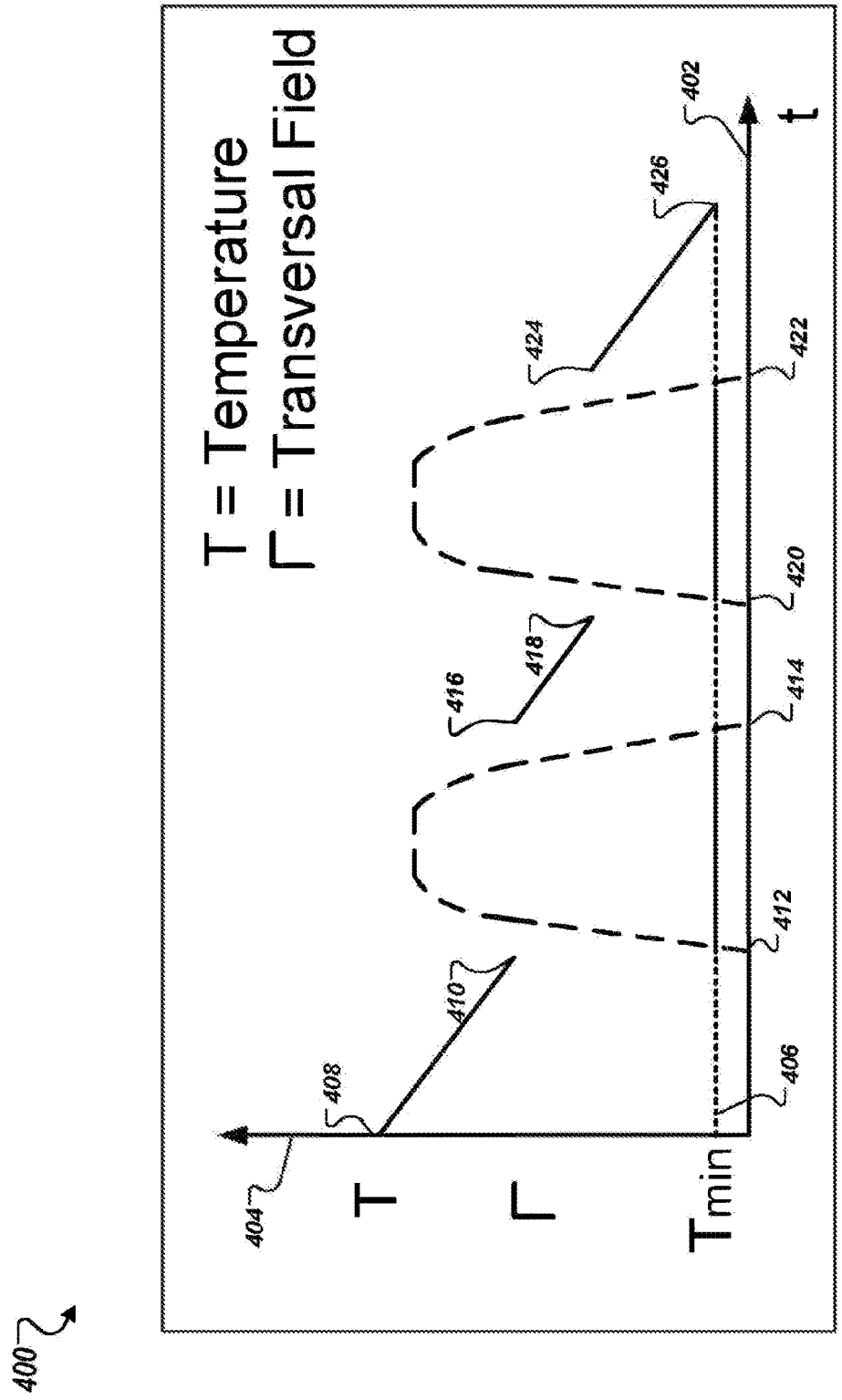
FIG. 4 is an example illustration of a Land Rover annealing schedule.

FIG. 4 is an example illustration 400 of a Land Rover annealing schedule. For example, the illustration 400 may represent an example process for performing annealing using a Land Rover algorithm with multiple iterations of simulated annealing followed by quantum annealing, as described above with reference to FIG. 2 and FIG. 3, as performed by an annealing system appropriately programmed in accordance with this specification, e.g., the annealing systems 100 and 120 of FIGS. 1A and 1B.

The illustration 400 includes an x axis 402 and a y axis 404. The x axis 402 represents time t, and the y axis 404 represents increasing temperature T and increasing transversal field strength Γ. As described above with reference to step 204 of FIG. 2, the illustration includes a determined minimum temperature value $T_{min}$ 406 and an initial temperature value T set to a determined maximum temperature value 408 for an initial state.

Simulated annealing with a temperature reduction schedule may be performed on the initial state between points 408 and 410 of the illustration to generate a first evolved state, as indicated by the solid line. Simulated annealing may be terminated at 410, for example due to the decrease in energy of the state reaching or dropping below a minimum value, and the temperature represented by 410 is reduced to the minimum temperature value 406.

Quantum annealing with a transversal field strength schedule may be performed on the first evolved state between points 412 and 414 of the illustration to generate a second evolved state, as indicated by the dashed line. Quantum annealing may be terminated at 414, for example due to performing a predetermined number of sweeps or due to the decrease in energy of the state reaching or dropping below a minimum value.

Simulated annealing may be resumed at point 416 of the illustration and performed on the second evolved state until point 418 to generate a third evolved state. The temperature values corresponding to points 410 and 416 are the same. Simulated annealing may be terminated at 418, for example due to the decrease in energy of the state reaching or dropping below a minimum value, and the temperature represented by 418 is reduced to the minimum temperature value 406.

Quantum annealing with a transversal field strength schedule may be performed on the third evolved state between points 420 and 422 of the illustration to generate a fourth evolved state, as indicated by the dashed line. Quantum annealing may be terminated at 422, for example due to performing a predetermined number of sweeps or due to the decrease in energy of the state reaching or dropping below a minimum value.

Simulated annealing may be resumed at point 424 of the illustration and performed on the fourth evolved state until point 426 where the minimum temperature is reached and a final state is reached, e.g., the lowest energy state. The temperature values corresponding to points 418 and 424 are the same. For clarity, three iterations of simulated annealing followed by quantum annealing are illustrated in FIG. 4, however the Land Rover algorithm may include a smaller or larger number of iterations.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for performing thermal annealing with quantum fluctuations, the method comprising:
    obtaining an initial input state;
    performing simulated annealing and quantum annealing on the initial input state and subsequent input states until a completion of a first event, the performing comprising:
        receiving an input state, the input state being one of the initial input state or a subsequent input state;
        performing simulated annealing on the input state with a temperature reduction schedule until a decrease in energy is below a first minimum value;
        terminating the simulated annealing in response to determining that the decrease in energy is below the first minimum level, comprising reducing the temperature to a minimum temperature value;
        outputting a first evolved state and first temperature value;
        performing quantum annealing on the first evolved state with a transversal field increase schedule until a completion of a second event occurs;
        terminating the quantum annealing in response to determining that a completion of the second event has occurred; and
        outputting a second evolved state as a subsequent input state for the simulated annealing; and
    determining that the completion of the first event has occurred.

2. The method of claim 1, wherein determining that the completion of the first event has occurred comprises determining that the first temperature value is lower or equal to the minimum temperature value.

3. The method of claim 1, wherein the initial input state is a state of a physical system whose ground state encodes the solution to an optimization task.

4. The method of claim 3, wherein determining that the completion of the first event has occurred further comprises performing a measurement on the first evolved state output with the first temperature value to determine the solution to the optimization task.

5. The method of claim 1, wherein performing simulated annealing on the input state with a temperature reduction schedule comprises performing a Metropolis algorithm.

6. The method of claim 1, wherein performing quantum annealing comprises repeating a number of sweeps of quantum annealing until the completion of the second event occurs.

7. The method of claim 1, wherein performing quantum annealing comprises repeating a number of sweeps of quantum annealing until a decrease in energy is below a second minimum value, wherein the second minimum value is different from the first minimum value.

8. The method of claim 1, wherein performing quantum annealing comprises:
creating a list of connected subgraphs;
computing a lowest achievable energy value for each connected subgraph;
computing the difference between a current energy value and the lowest achievable energy value for each connected subgraph;
determining that at least one difference is positive;
selecting the subgraph and corresponding transition that achieves an overall largest positive difference; and
performing the corresponding transition that achieves the overall largest positive difference.

9. The method of claim 8, wherein the connected subgraphs are of size K.

10. The method of claim 9, wherein the number of repeated sweeps is at most $Q_S N/K$, wherein $Q_S$ is a predetermined number of quantum sweeps and N is a system size.

11. The method of claim 8, wherein completion of a second event occurs when either (i) a fixed number of quantum sweeps have been performed, or (ii) the lowest achievable energy value for each connected subgraph is the same or higher than the current energy value.

12. The method of claim 8, wherein selecting the subgraph and corresponding transition that achieves the overall largest positive difference further comprises:
calculating a Hamming distance for each connected subgraph in a set of connected subgraphs that achieves the overall lowest achievable energy value;
determining that there is one subgraph with a shortest Hamming distance relative to the Hamming distance of other subgraphs; and
choosing the transition that has the shortest Hamming distance in response to determining that there is one subgraph with the shortest Hamming distance.

13. The method of claim 12, further comprising:
determining that there is more than one subgraph with a shortest Hamming distance; and
choosing the transition from the set of subgraphs that achieve the overall lowest achievable energy value and that have the shortest Hamming distance at random.

14. The method of claim 1, wherein the initial input state is a randomly chosen state.

15. The method of claim 1, wherein the initial input state is a classical state.

16. The method of claim 15, wherein preparing the classical state comprises setting the temperature to a predetermined maximum value.

17. An apparatus comprising:
an annealing system comprising a quantum system in communication with an auxiliary system, the annealing system configured to:
obtain an initial input state;
perform simulated annealing and quantum annealing on the initial input state and subsequent input states until a completion of a first event, comprising:
receiving an input state, the input state being one of the initial input state or a subsequent input state;
performing simulated annealing on the input state with a temperature reduction schedule until a decrease in energy is below a first minimum value;
terminating the simulated annealing in response to determining that the decrease in energy is below the first minimum level, comprising reducing the temperature to a minimum temperature value;
outputting a first evolved state and first temperature value;
performing quantum annealing on the first evolved state with a transversal field increase schedule until a completion of a second event occurs;
terminating the quantum annealing in response to determining that a completion of the second event has occurred; and
outputting a second evolved state as a subsequent input state for the simulated annealing; and
determine that the completion of the first event has occurred.

18. The apparatus of claim 17, wherein the auxiliary system acts as a thermal bath for the quantum system.

19. An apparatus comprising:
an annealing system comprising a quantum integrated circuit in communication with a classical integrated circuit, the annealing system configured to:
obtain an initial input state;
perform simulated annealing and quantum annealing on the initial input state and subsequent input states until a completion of a first event, comprising:
receiving an input state, the input state being one of the initial input state or a subsequent input state;
performing simulated annealing on the input state with a temperature reduction schedule until a decrease in energy is below a first minimum value;
terminating the simulated annealing in response to determining that the decrease in energy is below the first minimum level, comprising reducing the temperature to a minimum temperature value;
outputting a first evolved state and first temperature value;
performing quantum annealing on the first evolved state with a transversal field increase schedule until a completion of a second event occurs;
terminating the quantum annealing in response to determining that a completion of the second event has occurred; and
outputting a second evolved state as a subsequent input state for the simulated annealing; and
determine that the completion of the first event has occurred.

* * * * *